United States Patent
Brauer et al.

(10) Patent No.: US 10,196,966 B2
(45) Date of Patent: Feb. 5, 2019

(54) MODULAR POWER UNIT

(71) Applicant: Caterpillar Inc., Peoria, IL (US)

(72) Inventors: Matt Brauer, Peoria, IL (US); Jacob Carl Wyss, Mediapolis, IA (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/380,065

(22) Filed: Dec. 15, 2016

(65) Prior Publication Data

US 2018/0172362 A1 Jun. 21, 2018

(51) Int. Cl.
| | |
|---|---|
| *E02F 3/76* | (2006.01) |
| *F02B 37/00* | (2006.01) |
| *E02F 3/815* | (2006.01) |
| *E02F 9/28* | (2006.01) |
| *E02F 9/08* | (2006.01) |
| *F02B 61/00* | (2006.01) |
| *F02B 77/00* | (2006.01) |
| *G21D 5/02* | (2006.01) |
| *G21H 3/00* | (2006.01) |
| *E02F 9/22* | (2006.01) |
| *G21C 19/42* | (2006.01) |

(52) U.S. Cl.
CPC ............ *F02B 37/00* (2013.01); *E02F 3/7609* (2013.01); *E02F 3/815* (2013.01); *E02F 9/0833* (2013.01); *E02F 9/2875* (2013.01); *F02B 61/00* (2013.01); *F02B 77/00* (2013.01); *G21D 5/02* (2013.01); *G21H 3/00* (2013.01); *E02F 9/2275* (2013.01); *F02B 2201/00* (2013.01); *G21C 19/42* (2013.01)

(58) Field of Classification Search
CPC ...... F28D 1/0408; F28F 9/002; B62D 21/186; B62D 33/06; B62D 33/02; B62D 63/025; B66C 23/62; B66C 23/82; E02F 9/121; E02F 9/08; E02F 9/0808; E02F 3/7609; E02F 3/815; E02F 9/2875; E02F 9/2275; E02F 9/0833; B60G 3/20; B60G 7/02; B60K 5/10; F02B 37/00; F02B 61/00; F02B 77/00; G21C 19/42; G21D 5/02; G21H 3/00

USPC .................. 180/291, 292, 294, 190.03, 312; 280/881; 296/193.01, 204; 172/1, 190

See application file for complete search history.

(56) References Cited

U.S. PATENT DOCUMENTS

| | | | | |
|---|---|---|---|---|
| 3,101,150 | A * | 8/1963 | Janson | B62D 49/0678 180/12 |
| 3,783,964 | A * | 1/1974 | Telesio | B60K 5/10 180/294 |
| 5,689,953 | A * | 11/1997 | Yamashita | B60K 11/02 123/41.49 |
| 6,543,562 | B1 * | 4/2003 | Repko | E02F 3/7636 180/54.1 |
| 6,736,232 | B1 * | 5/2004 | Bergstrom | B60G 3/20 180/292 |
| 7,398,847 | B2 | 7/2008 | Schmitt | |

(Continued)

*Primary Examiner* — Robert E Pezzuto
(74) *Attorney, Agent, or Firm* — Miller, Matthias & Hull

(57) ABSTRACT

A work machine is provided. The work machines may include a power module configured to provide power including a battery and an engine and configured to a folding heat exchange device. The work machine may also include a drive module configured with one or more motors and positioned over a track roller frame. The work machine may also include a hydraulic module including one or more devices in a front region and one or more devices in a rear region to cut or rip encountered material

14 Claims, 11 Drawing Sheets

(56) References Cited

U.S. PATENT DOCUMENTS

| | | | |
|---|---|---|---|
| 7,552,757 B2 | 6/2009 | Hassdenteufel et al. | |
| 8,616,265 B2 | 12/2013 | Fell et al. | |
| 8,657,057 B2 * | 2/2014 | Bolz | B62D 21/186 |
| | | | 180/291 |
| 9,630,614 B1 * | 4/2017 | Hill | B60W 20/13 |
| 2007/0169989 A1 * | 7/2007 | Eavenson | F01N 13/082 |
| | | | 181/204 |
| 2007/0175849 A1 * | 8/2007 | Yokoyama | B66C 23/62 |
| | | | 212/180 |
| 2010/0070117 A1 | 3/2010 | Siffert | |
| 2011/0005847 A1 * | 1/2011 | Andrus | B62D 55/084 |
| | | | 180/9.1 |
| 2011/0277961 A1 * | 11/2011 | Knepper | F01P 3/18 |
| | | | 165/104.19 |
| 2013/0026789 A1 * | 1/2013 | Schott | B62D 21/186 |
| | | | 296/193.01 |

\* cited by examiner

MODULAR POWER UNIT

TECHNICAL FIELD

The present disclosure generally relates to work machines and, more particularly, relates to cab-less autonomous track-type tractors.

BACKGROUND

Track-type tractors, earth-moving machines and other work machines generally may contain parts which are often integrated as one self-contained assembly. Many parts of the work machine are often used to perform certain functioning. For instance, a blade and ripping unit at the front and back of the work machine, respectively, may be configured to cut and rip material encountered by the work machine on its path. A power unit within the work machine may include a battery and an engine and may provide the power within the work machine.

In typical work machines or track-type tractors, the parts described above may often be integrated with the work machine, wherein the entire work machine may be one self-contained assembly in which the parts of the work machine cannot be separated from another or separately removed from the work machine. More specifically, parts such as the engine, battery, generator, inverter, and cooling package are all integrated within a typical work machine. Further, other parts such as a blade at the front of the work machine, and the ripper at the back of the work machine are often integrated with the typical work machine.

Accordingly, a problem associated with typical work machines is that there often a high number of connections and interface points within the machine. As such, access to the various parts and components within the work machine may be cumbersome as a result. Maintenance of the work machine may be more difficult given the number of connections and interface points within the work machine. It may often be difficult to access and successfully maintain the various parts of the work machine given the high number of connections and interface points within the work machine.

Another problem associated with a work machine that typically has integrated parts and a high number of connection points is that it may be often difficult to remove various parts for service and testing. Parts which may need service and maintenance such as the engine or battery cannot be separately removed from the work machine while leaving the other parts of the work machine intact. Accordingly, if the engine or battery needs maintenance, the entire work machine would need to be taken to a maintenance facility, service station, or the like to provide maintenance or service to the battery or engine. Further, providing maintenance or testing on either the battery or engine may also involve having to navigate or work around the other parts of the work machine since parts cannot typically be removed from a typical work machine or the like. Accordingly, the testing of and maintenance of the work machine can be very tedious, cumbersome and time-consuming as a result.

Various configurations may exist to purportedly allow easier access to parts and maintenance and testing of various components of track-type tractors and work machines. For example, U.S. Pat. No. 7,938,847, entitled "Radiator Arrangement," discloses how a radiator arrangement may be present within an engine compartment, wherein the radiator arrangement includes a first radiator and a second radiator. However, such configurations face the common challenge that the all of the parts of the work machine are integrated within the work machine and cannot be separately removed from the work machine. As a result, such configurations do not address the problem of easy access to parts within the machine, and timely maintenance and testing of the various parts of the work machine.

In view of the foregoing disadvantages associated with known work machines, a need exits for a cost effective solution which would not drastically alter the physical structure of the work machine, and yet still allow for easy access to the various parts within the work machine. In addition, a need exits for various parts of the work machine to be separately removed from the work machine should maintenance or testing of the various parts be required. The present disclosure is directed at addressing one or more of the deficiencies and disadvantages set forth above. However, it should be appreciated that the solution of any particular problem is not a limitation on the scope of the disclosure or of the attached claims except to the extent expressly noted.

SUMMARY OF THE DISCLOSURE

In one aspect of the present disclosure, a work machine is provided. The work machine may include a power module configured to provide power and including a battery and an engine coupled to a folding heat exchange device. The work machine may also include a drive module configured over a track roller frame with one or more motors. The work machine may also include a hydraulic module including one or more devices in a front region and one or more devices in a rear region to cut or rip encountered material.

In another aspect of the present disclosure, an electric drive machine is provided. The electric drive machine may include a front module configured with a blade to cut and rip encountered material. The electric drive machines may include a power module with a battery and an engine to provide power. The electric drive machines may also include a drive module positioned on a plurality of tracks with at least one motor. The electric drive machines may also include a rear module with one or more ripping devices to rip the encountered material.

In yet another aspect of the present disclosure, a power modular device is provided. The power modular device may include an engine coupled to an intake manifold and an exhaust manifold, and including an exhaust system with an exhaust inlet and an exhaust outlet and a turbocharger, and configured to provide electrical power. The power modular device may also include a battery connected to a fuel pump. Further, the power modular device may also include a folding heat exchange device positioned over the battery and the engine and configured to be folded in the vertical direction to allow access to the battery and the engine.

These and other aspects and features will be more readily understood when reading the following detailed description in conjunction with the accompanying drawings.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
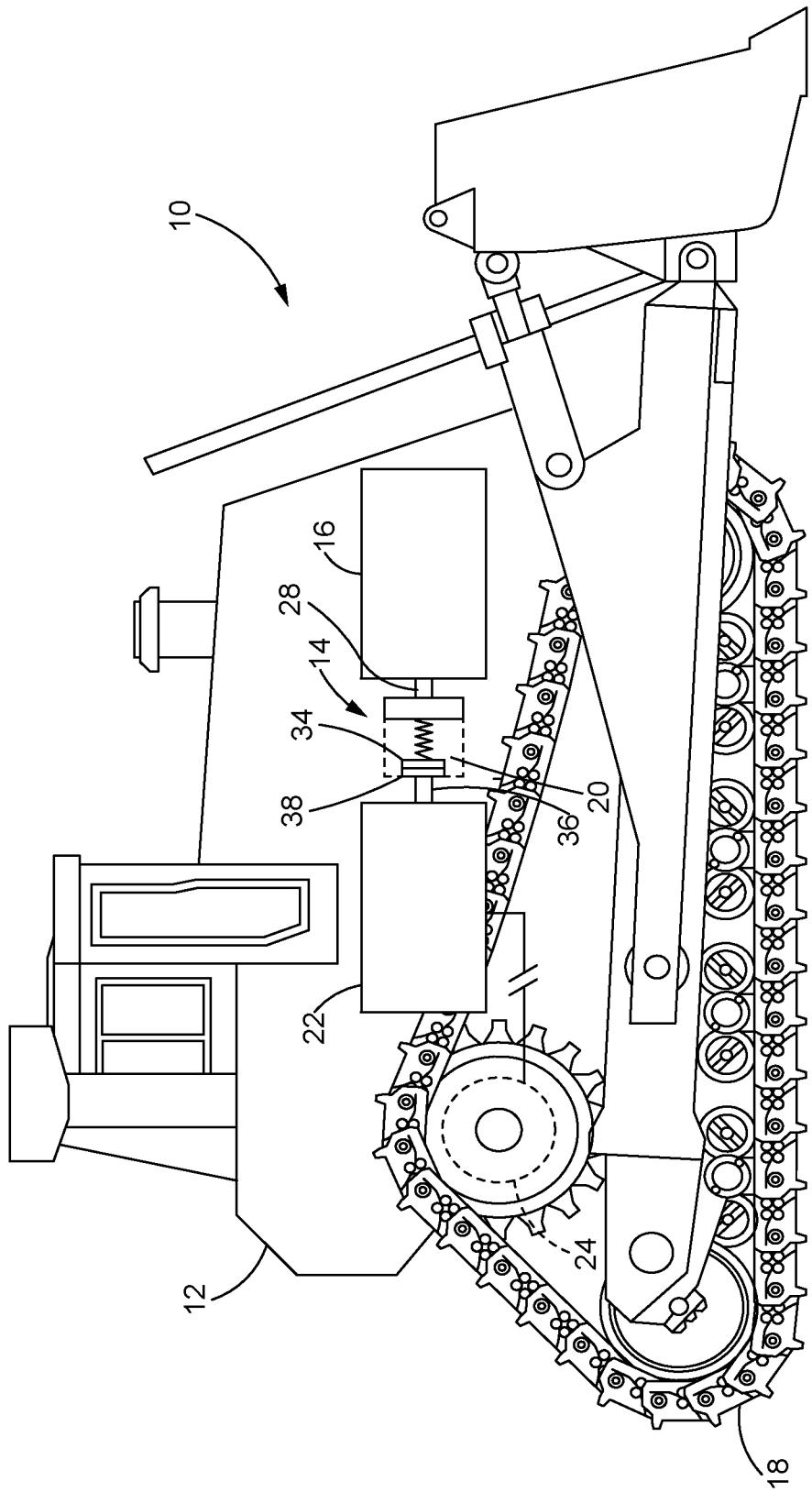
FIG. 1 is a side view of a machine with an electrical power system in accordance with the present disclosure.

Referring now to the drawings and with specific reference to FIG. 1, a machine 10 is depicted. With continued reference to FIG. 1, the machine 10 may be an electrically powered track-type tractor 10, truck, earth-moving machine, work machine or the like. The machine 10 is illustrated in the context of a track type machine that may be used in construction, mining, road building, or the like. The machine 10 is nevertheless not limited to just performing construction, mining, or road building, and may be used for other purposes. The machine 10 may include a mobile electric drive machine having a frame 12. The frame 12 may have an electrical power system 14 mounted therein. The electrical power system 14 may include an engine 16 that provides electrical power for the machine 10. The machine 10 may also include one or more tracks 18. The machine 10 may also include a drive coupling 20 between the engine 16 and a generator 22. An electric motor 24 may be provided that is coupled to the generator 22 and configured to drive the tracks 18. The electric motor 24, the tracks 18, the drive coupling 20, and the electrical power system 14 can comprise a propulsion system for the machine 10.

The drive coupling 20 may transmit torque between the engine 16 and the generator 22. The drive coupling 20 may be driven by an engine output shaft 28. The generator 22 may rotate and generate electrical power. The drive coupling 20 may also include a reaction plate 34. The reaction plate 34 may rotate with the engine 16. The generator 22 may include an input shaft 36 that is coupled with a friction plate 38. Accordingly, the machine 10 described above is comprised of various modules. As will be described below, the major components of the machine 10 are broken into easily assembled, and easily accessible modules to allow for the modules of the machine 10 to be tested separately and to reduce the number of unnecessary connections within the machine 10.

Figure 2:
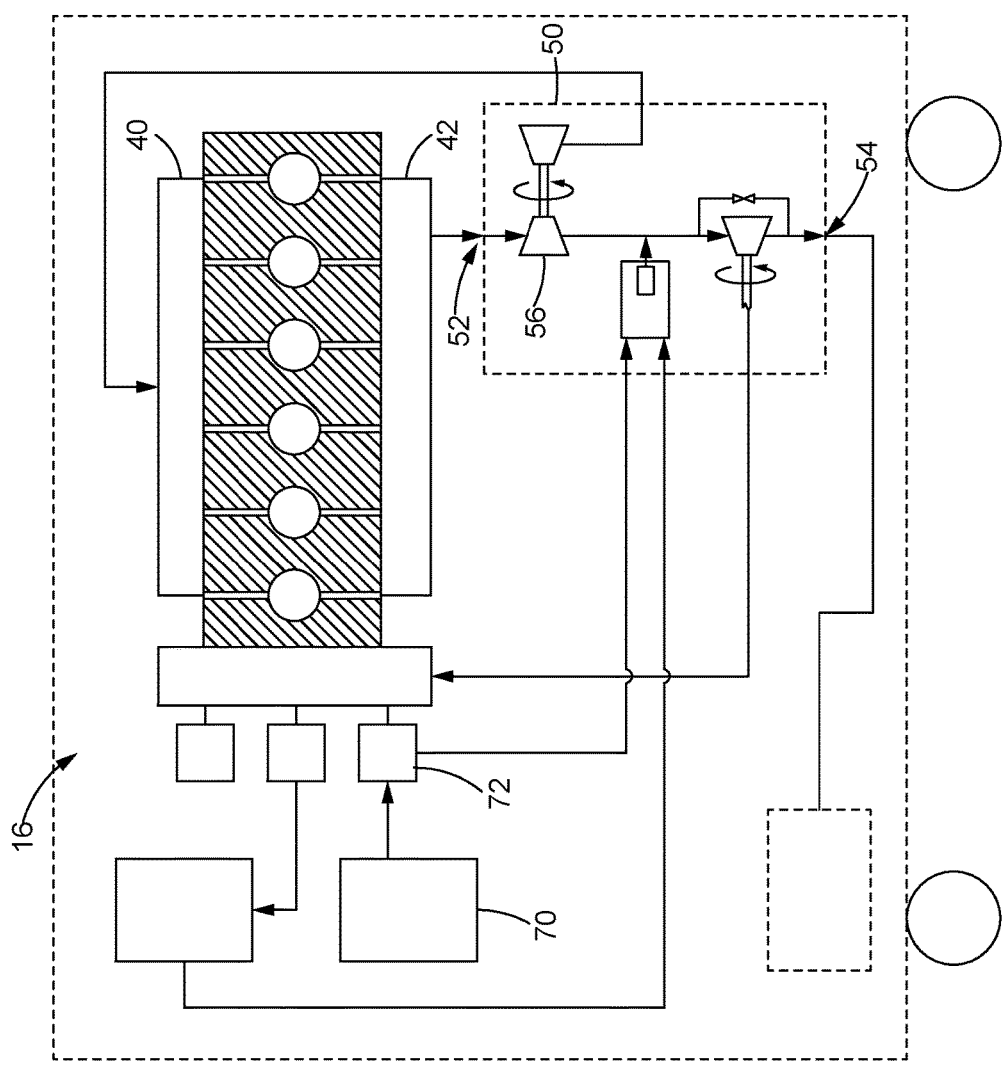
FIG. 2 is a schematic illustration of an engine according in accordance with the present disclosure.

FIG. 2 illustrates a schematic diagram of the engine 16 described in FIG. 1. The engine 16 includes an intake manifold 40 and an exhaust manifold 42. An exhaust system 50 is included within the engine 16 as well. The exhaust system 50 includes an exhaust inlet 52 and an exhaust outlet 54. A turbocharger 56 may be disposed within the exhaust system 50. A battery 70 is provided and electrically connected to a fuel pump 72.

Figure 4:
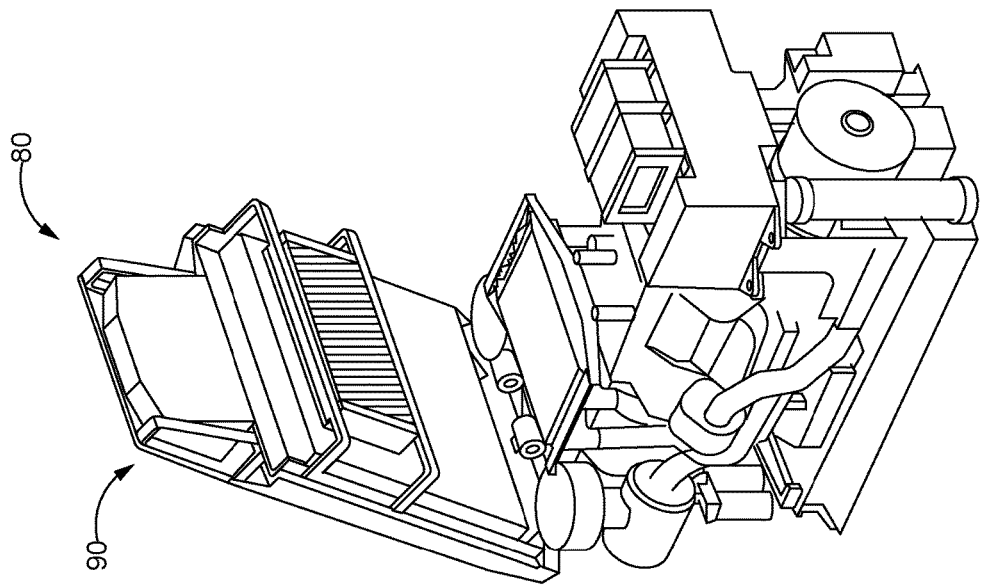
FIG. 4 is another perspective view of the power module of FIG. 3 in accordance with the present disclosure.
Figure 3:
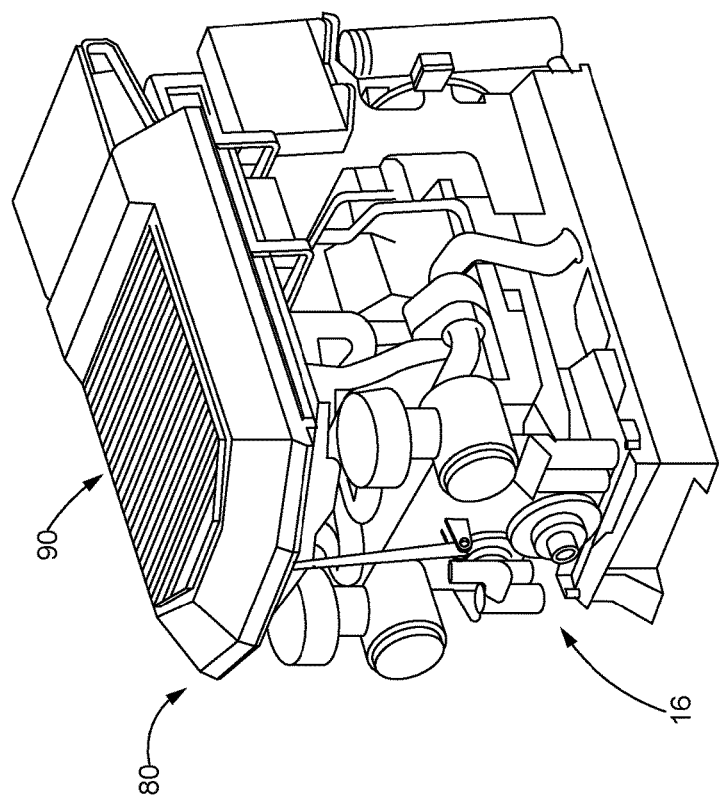
FIG. 3 is a perspective view of a power module in accordance with the present disclosure.

Referring to FIGS. 3-4, one module of the machine 10 is depicted as a modular power unit 80. The modular power unit 80 may include the battery 70 and the engine 16 described above. With typical machines, power units are integrated into a core of the machine 10, and the servicing of the power unit that is integrated into the machine 10 may be cumbersome and time consuming. Such a power unit may not be easily removed or attended to if it is integrated with the machine 10. In addition, if a new type of power source became available, it may be difficult to place the new power unit into the machine 10. Accordingly, it may be harder for the machine 10 be fitted with the new power source. In the present disclosure, on the other hand, the modular power unit 80 is not integrated within the core of the machine 10. As a result, the modular power unit 80 minimizes its interfaces with the other units in the machine 10 to allow for easy service and future adaptability. The modular power unit 80 is part of the machine 10, but is not integrated as one single unit with the other units of the machine 10. The modular power unit 80 may be removed apart from the machine 10 should the modular power unit 80 require testing, service or if it was needed to be used in another machine or the like. Moreover, the modular power unit 80 could also be adapted to different technologies.

The modular power unit 80 may include a folding heat exchange device 90. The folding heat exchange device 90 may be positioned atop of the battery 70 and the engine 16. The folding heat exchange device 90 can either be placed over both the engine 16 and the battery 70, or in the alternative, the folding heat exchange device 90 may be lifted or folded up as shown in FIG. 4 to allow for access to the engine 16 and battery 70 or other parts within the modular power unit 80.

As illustrated in FIG. 4, the advantages of the folding heat exchange device 90 is easy access to the engine 16 or battery 70 or other parts within the modular power unit 80. For instance, if any of the parts of the modular power unit 80 needed to be repaired, the modular power unit 80 can be easily removed from the machine 10. In addition, the mobility of the folding heat exchange device 90 can allow the parts which need to be serviced within the modular power unit 80 to be easily accessible. Another advantage of the folding heat exchange device 90 is that it is easier to test the battery 70 or engine 16 or other parts within the modular power unit 80. There is simple access to any parts within the modular power unit 80 that need to be serviced. The modular power unit 80 can also be used for different machines. Overall, having the modular power unit 80 not being integrated with the machine 10 allows the modular unit 80 to be easier to repair and service and to use in other machines or the like.

Figure 5:
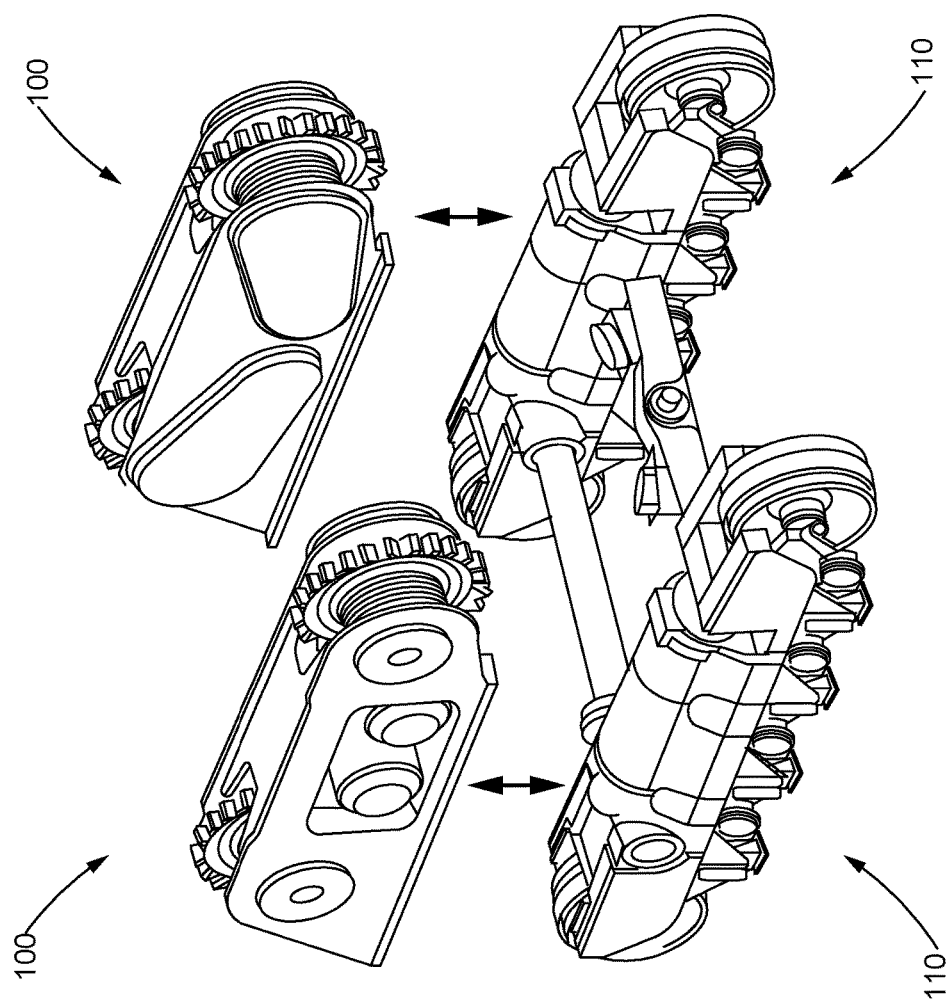
FIG. 5 is an exploded perspective view of the drive modules in one embodiment in accordance with the present disclosure.
Figure 6:
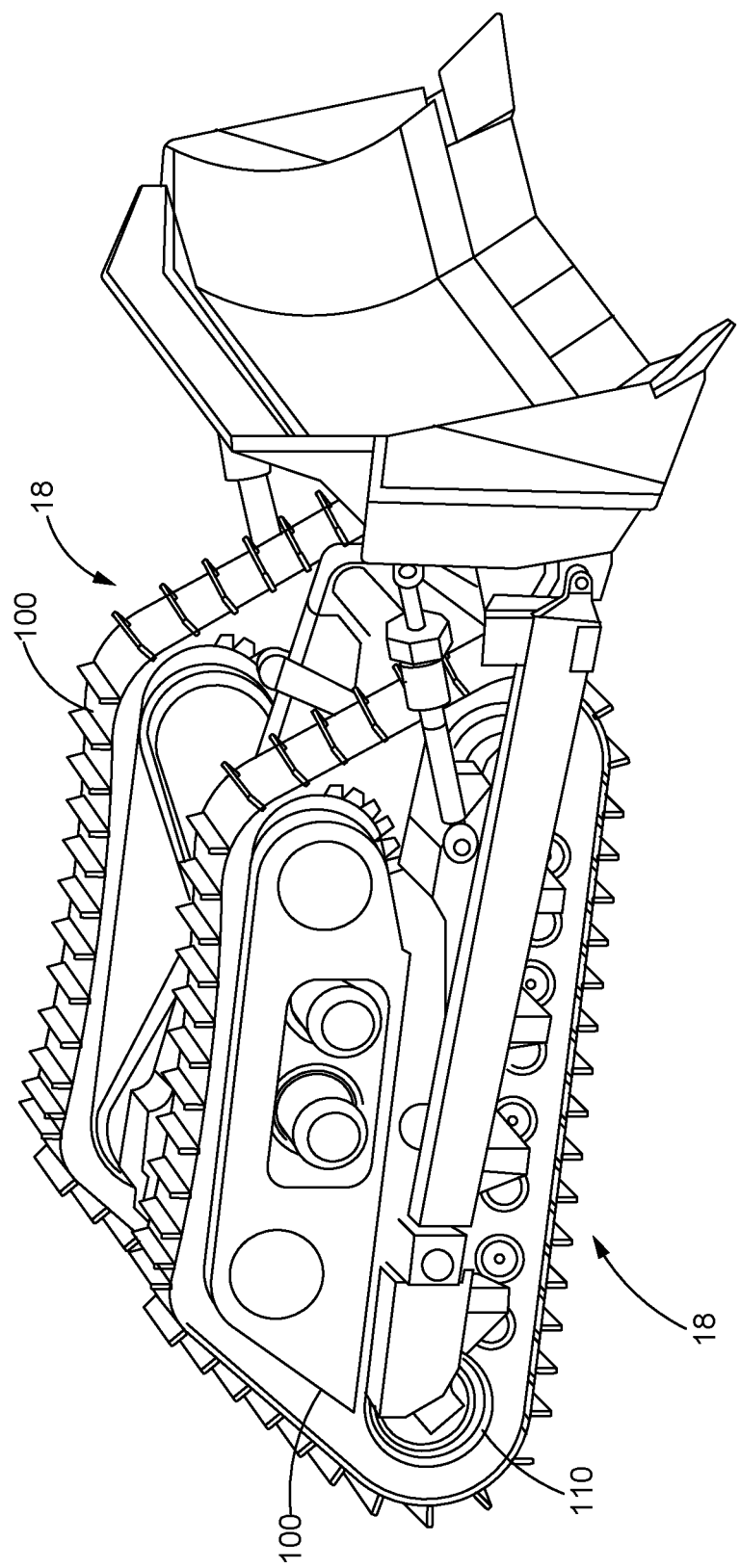
FIG. 6 is a perspective view of the work machine including the drive modules in accordance with the present disclosure.
Figure 7:
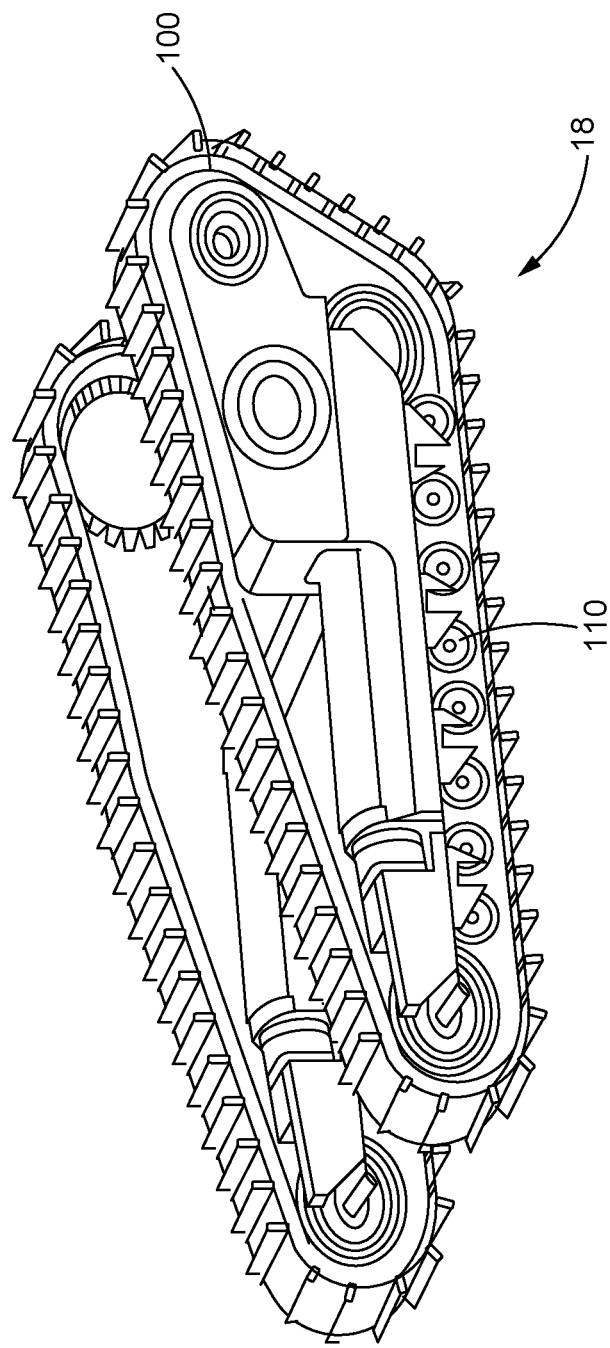
FIG. 7 is an another perspective view of the drive modules in another embodiment in accordance with the present disclosure.

Referring to FIG. 5, another module of the present disclosure, a drive module 100, is illustrated to fit over a track roller frame 110. The track roller frame 110 is a large structure positioned on the outside of the machine 10 as shown in FIG. 5. Designing the drive module 100 to fit about the track roller frame 110 will allow for easy assembly, service and general access. The drive module 100 or track roller frame 110 is not integrated with the rest of the machine 10. As a result, the drive module 100 can be easily removed from the machine 10 without affecting the other modules of the machine 10, and also be serviced when necessary. The drive module 100 may be provided in various embodiments, with two being depicted. FIG. 6 illustrates one embodiment, wherein the drive module 100 may have a dual motor trapezoidal track configuration. The dual motor with dual sprocket design may be chosen so that the torque and power requirements could be met without exceeding the length and width envelope of the current track roller frame 110. FIG. 7 illustrates another embodiment in which the drive module 100 may have a single motor design. In the single motor design, the track 18 may extend beyond the back of the track roller frame 110. In the single and dual drive configuration, the drive module 100 is bolted to a top portion of the track roller frame 110. The drive module 100 can be disconnected from the machine 10 by unwrapping the track 18 and unbolting it from the track roller frame 110.

With either embodiment, the benefits from the drive module 100 fitting over the track roller frame 110 include being able to service either the drive module 100 or the track roller frame 110 apart from the machine 10 and provide easy care and maintenance for the drive module 100. As stated above, the drive module 100 and track roller frame 110 are not integrated with the machine 10. Accordingly, both the drive module 100 and track roller frame 100 may be serviced apart from the machine 10, or used in another work machine or the like.

Figure 8:
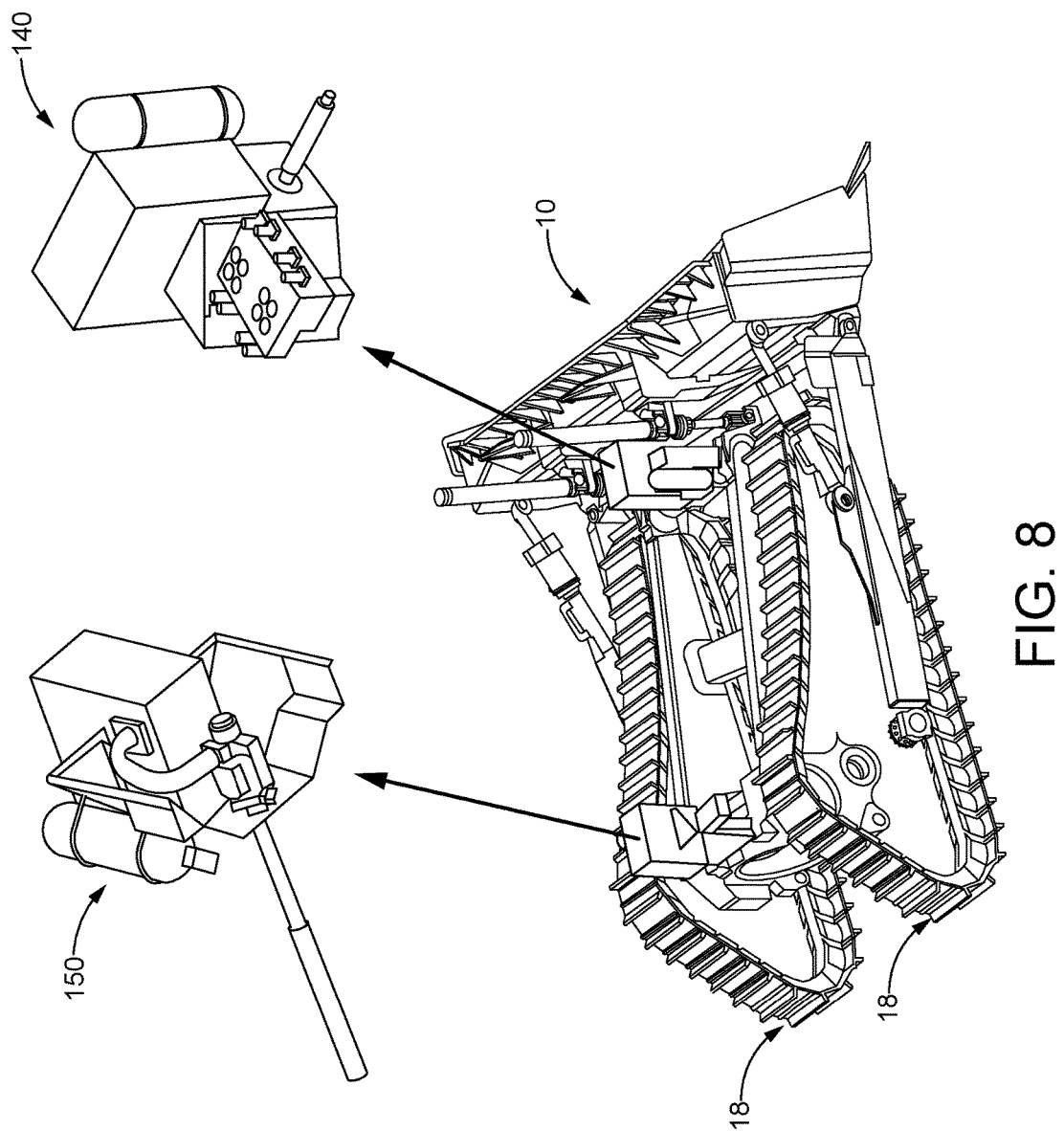
FIG. 8 is an exploded view of the work machine including hydraulic modules in accordance with the present disclosure.

Another module type is depicted in FIG. 8. As shown therein, hydraulic modules with a front unit 140 and a rear unit 150 are illustrated. Normally, hydraulic units or modules are fully integrated onto work machines. As a result, although part redundancy within a machine may be minimized, a high number of interface points within a machine may exist. In addition, maintenance on the hydraulic units may be cumbersome when the hydraulic units are integrated with the machine. As a result, the entire machine would need to be brought in even if only the hydraulic units needed to be serviced. To remedy this problem, the present disclosure has separated the hydraulics of the machine into two units. The front unit or module 140 is positioned in front of the machine 10, and includes a blade. The rear unit 150 or module is positioned at the back of the machine 10 and includes a plurality of ripping devices. The front unit 140 and the rear unit 150 are connected to the engine by a power take off (PTO) shaft.

The benefits for the front unit 140 and the rear unit 150 are similar to the other modules of the machine 10 described above. If either the front unit 140 or the rear unit 150 needs to be serviced, the entire front unit 140 or rear unit 150 can be pulled from the machine 10 without removing any other modules from the machine 10. Only PTO shafts or hydraulic line connections which connect the front unit 140 or rear unit 150 to the machine need to be removed. In other embodiments, the front unit 140 and the rear unit 150 could be designed to fit up to a shop test unit. As a result of having the front unit 140 and the rear unit 150 not being integrated with the machine 10, both units 140, 150 may be tested apart from the machine. Accordingly, the service of both units 140, 150 and also the rest of the machine 10 becomes simpler, and the downtime in which the entire machine 10 faces is drastically reduced.

Figure 9:
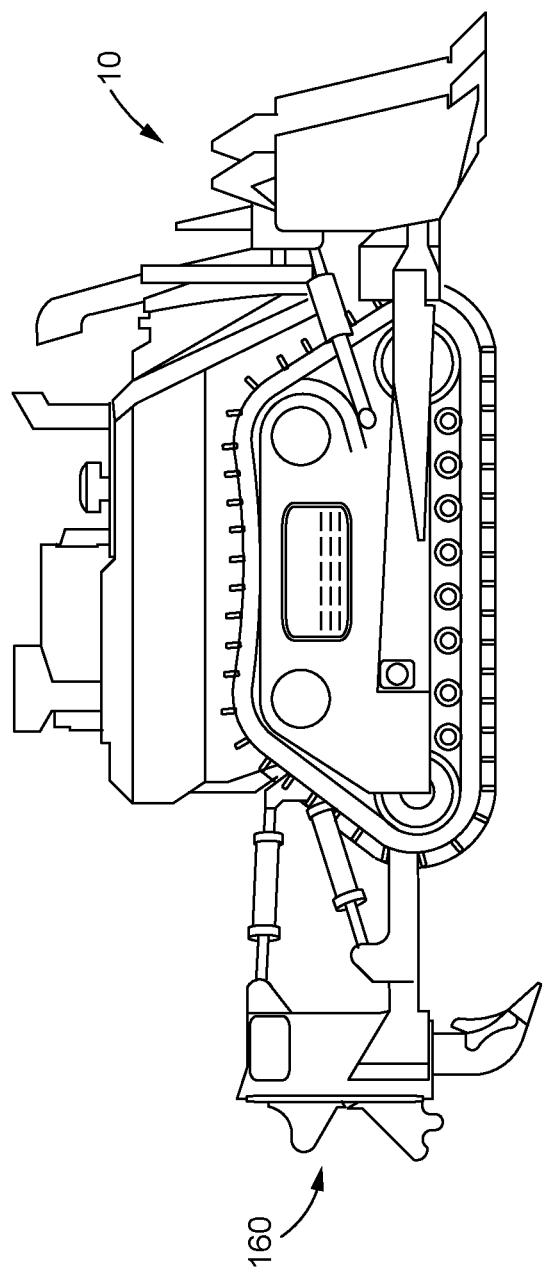
FIG. 9 is a side view the work machine including a ripping module in accordance with the present disclosure.
Figure 10:
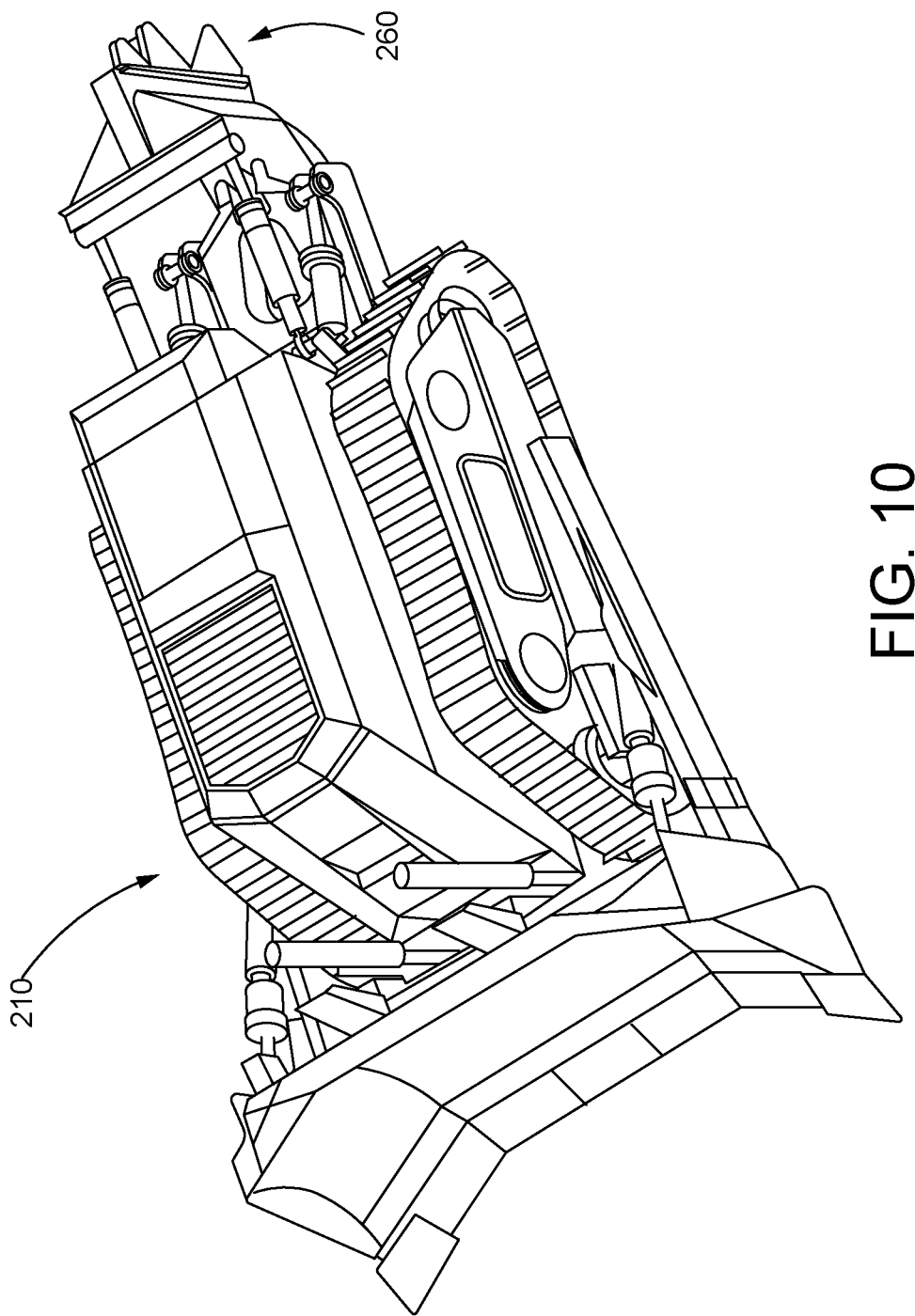
FIG. 10 is a top view of a work machine in accordance with the present disclosure.
Figure 11:
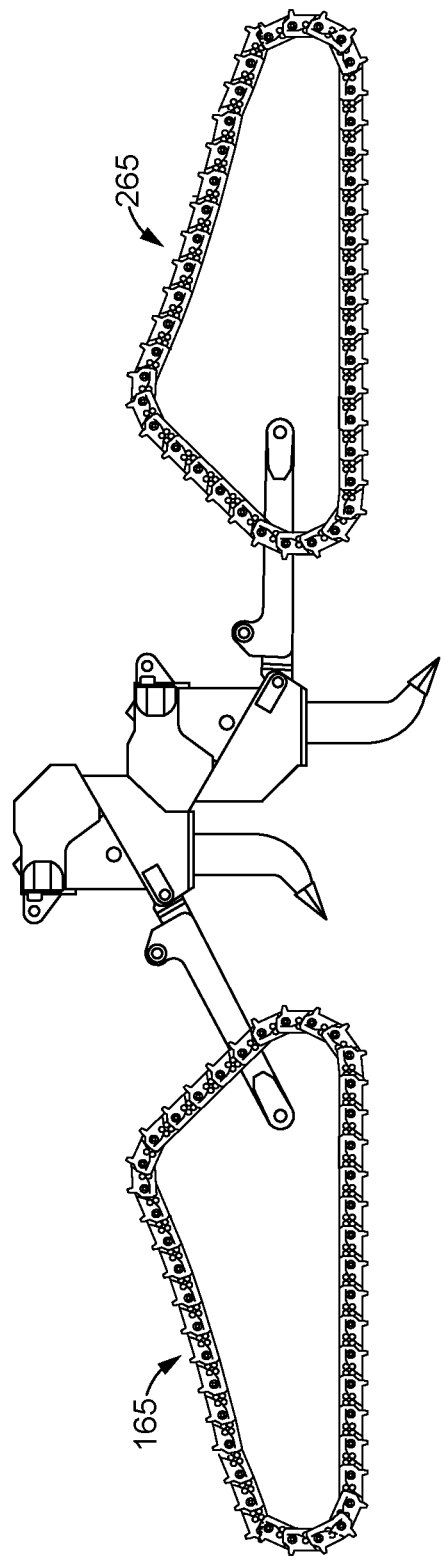
FIG. 11 is a side view of ripping devices in accordance with the present disclosure.

Turning to FIG. 9, another module, a ripping module 160 of the machine 10, is illustrated. The ripping module 160 is located at rear portion of the machine 10. The ripping module 160 may include a ripping device 165. Another machine 210 with similar configurations to the machine 10 also includes a ripping module 260 as shown in FIG. 10. The ripping module 260 may also include a ripping device 265. The ripping devices 165, 265 shown in FIG. 11 are designed to rip material that may typically require the weight and power of a larger machine through assisted ripping. Such material may include large rocks, dirt, gravel or the like which the machines 10, 210 may encounter when in use. During a ripping procedure, the ripping device 165 of the machine 10 performs assisted ripping by being coupled within the ripping device 265 of machine 210 as shown in FIG. 11. Assisted ripping involves providing smaller machines such as the ripping module 160 the capability to rip material that would typically require the weight and power of larger machines. Ordinarily, large rocks or a large amount of dirt or gravel found within the earth may typically require a large ripping unit or module. An overall benefit of assisted ripping is that it allows for smaller devices to be used to rip bigger and harder material through assisted ripping between the ripping devices 165, 265.

INDUSTRIAL APPLICABILITY

In general, the present disclosure may find applicability in various industrial work machines or the like. Such machines may be employed as prime movers, earth movers, rail, marine devices or the like. The present disclosure includes a machine configured with various modules which are not integrated with the machine 10 to allow each of the modules to be easily removed from the machine 10 when the modules need service or maintenance. The machine 10 is configured with easily assembled and easily accessible modules that are not integrated with the machine 10. In the present disclosure, the modular power unit 80 minimizes its interfaces with the other units in the machine 10 to allow for easy service and future adaptability. In addition, the folding heat exchange device 90 may be lifted or folded up as shown in FIG. 3 to allow for access to the engine 16 and battery 70 or other parts within the modular power unit 80 that may require service. The drive module 100 is not integrated with the rest of the machine 10. As a result, the drive module 100 with either of the two designs described above can be easily removed from the machine 10 without affecting the other modules of the machine 10, and also be serviced when necessary. Through assisted ripping, both the ripping devices 165, 265 are able to rip a larger and heavier amount of rock, gravel or the like that would typically require a larger ripping unit or module.

Figure 12:
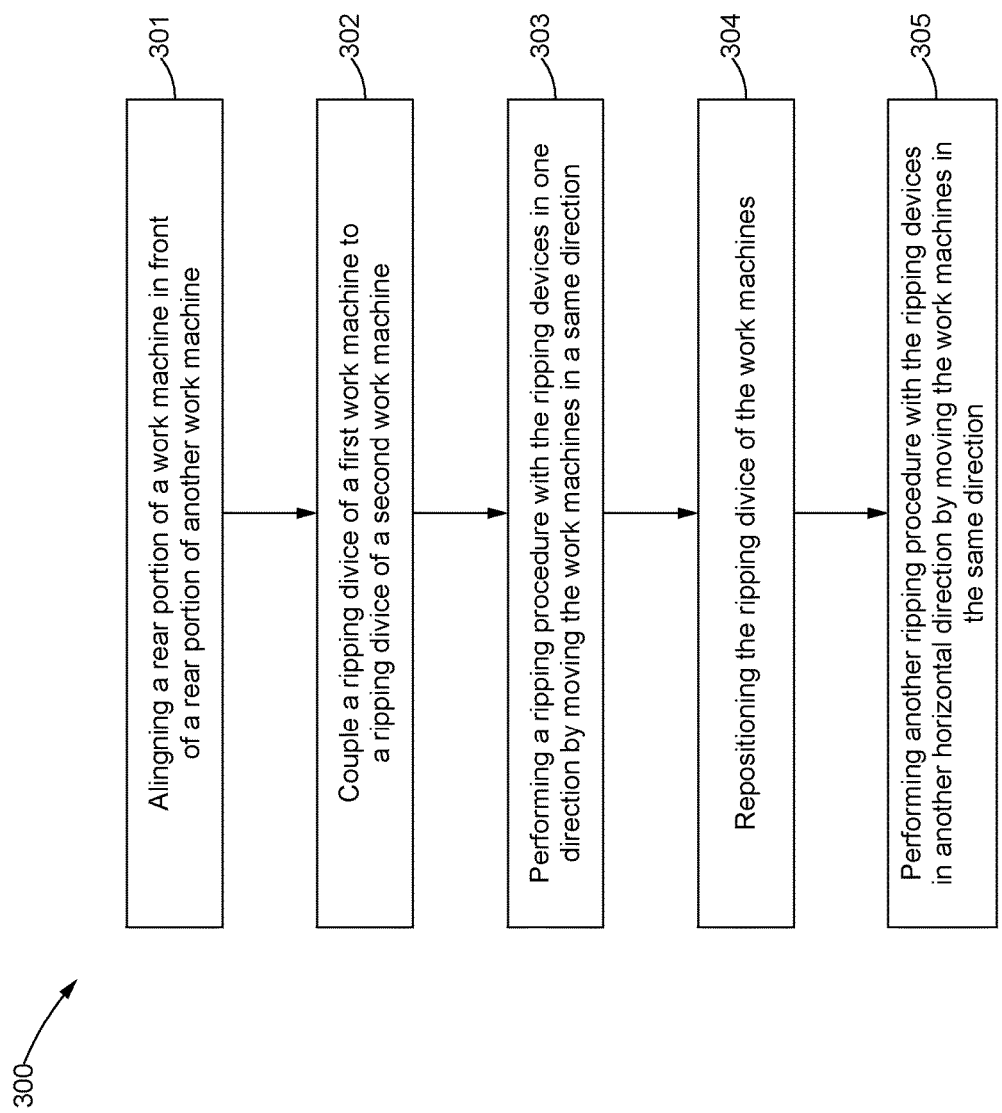
FIG. 12 is a flow chart depicting a sample sequence of steps in accordance with the present disclosure.

Turning now to FIG. 12, an exemplary method 300 for performing a ripping procedure in accordance with the present disclosure is illustrated. Starting in block 301, a rear portion of the machine 10 may be aligned with a rear portion of the machine 210. In a next block 302, the ripping device 165 of the machine 10 may be coupled to the ripping device 265 of the machine 200. In block 303, the work machines 10, 210 then move in the same horizontal direction, and a ripping procedure is performed by the ripping devices 165, 265. The ripping device 165 may transfer all of its weight and tractive force onto the ripping device 265 to perform assisted ripping. Next in block 304, the ripping devices 165, 265 are then repositioned. In block 305, the ripping procedure is performed in another horizontal direction, wherein the machines 10, 210 still move in the same direction to enable another ripping procedure to be performed. During this ripping procedure, the weight and tractive force of the ripping device 265 is transferred onto the ripping device 165.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. A modular power unit for a work machine, comprising:
   an engine;
   a generator connected to the engine;
   a battery connected to the engine but not the generator; and
   a heat exchanger foldably connected to the engine, with the engine, generator, battery and heat exchanger being self-contained, unitary and configured to be removable and replaceable from an engine compartment of the work machine as a single unit without removing any other modules or parts of the work machine.

2. The modular power unit for a work machine of claim 1, wherein the heat exchanger foldably connected to the engine is positioned directly over the battery and the engine.

3. The modular power unit for a work machine of claim 1, wherein the heat exchanger foldably connected to the engine is removed to allow access to the battery and the engine.

4. The modular power unit for a work machine of claim 1, wherein the modular power unit is not integrated with the work machine.

5. The modular power unit for a work machine of claim 1, wherein the heat exchanger foldably connected to the engine is not removed from the modular power unit when the battery and the engine are tested.

6. The modular power unit for a work machine of claim 1, wherein the heat exchanger foldably connected to the engine can be folded in a vertical direction to allow access to the battery and the engine.

7. The modular power unit for a work machine of claim 1, wherein the battery and the engine can be separately removed apart from the modular power unit.

8. A work machine, comprising:
   a chassis;
   an engine compartment supported by the chassis;
   an engine mounted on the chassis and within the engine compartment;
   a generator connected to the engine and mounted within the engine compartment;
   a battery connected to the engine, and mounted within the engine compartment, but not connected to the generator; and
   a heat exchanger foldably connected to the engine, the engine, generator, battery and heat exchanger forming a modular power unit that is removable and replaceable from the engine compartment as a single unit without removing any other modules or parts of the work machine.

9. The work machine of claim 8, wherein the heat exchanger is positioned directly over the battery and the engine.

10. The work machine of claim 8, wherein the modular power unit is not integrated with the work machine.

11. The work machine of claim 10, wherein the modular power unit is removable from one work machine and installable in another work machine.

12. The work machine of claim 9, wherein the heat exchanger is removed from the modular power unit when the battery and engine are being serviced.

13. The work machine of claim 9, wherein the heat exchanger can be folded in a vertical direction to allow access to the battery and the engine.

14. A
   method of operating a plurality of machines with a plurality of modular power units, comprising:
   providing a plurality of work machines;
   providing a plurality of modular power units, each power unit including an engine, a generator, a battery and heat exchanger, each modular power unit being mounted in an engine compartment of one of the work machines;
   removing the modular power unit from the engine compartment of the work machine without removing any other modules, parts or systems of the work machine;
   installing the modular power unit in another engine compartment of another of the plurality of work machines without removing any other modules, parts, or systems of the work machine.

* * * * *